(12) United States Patent
Tsyganskiy et al.

(10) Patent No.: US 7,536,315 B2
(45) Date of Patent: May 19, 2009

(54) SELF-BALANCING OF IDEA RATINGS

(75) Inventors: Igor Tsyganskiy, Los Gatos, CA (US); Eugene Satsuta, Mountain View, CA (US)

(73) Assignee: SAP Aktiengesellschaft, Walldorf (DE)

( * ) Notice: Subject to any disclaimer, the term of this patent is extended or adjusted under 35 U.S.C. 154(b) by 1097 days.

(21) Appl. No.: 10/367,115

(22) Filed: Feb. 13, 2003

(65) Prior Publication Data

US 2004/0162751 A1    Aug. 19, 2004

(51) Int. Cl.
*G06Q 10/00* (2006.01)
(52) U.S. Cl. .......................................... 705/10
(58) Field of Classification Search ................... 705/7, 705/10
See application file for complete search history.

(56) References Cited

U.S. PATENT DOCUMENTS

| | | | | |
|---|---|---|---|---|
| 6,795,793 | B2 * | 9/2004 | Shayegan et al. | 702/179 |
| 2003/0014428 | A1 * | 1/2003 | Mascarenhas | 707/200 |
| 2004/0064266 | A1 * | 4/2004 | Baird et al. | 702/34 |

OTHER PUBLICATIONS

MacCrimmon, Kenneth R.; Wagner, Christian; "Stimulating Ideas Through Creativity Software", Nov. 1994, Management Science, vol. 40, No. 11, pp. 1514-1532.*
Badiru, Adedeji; "Computational Survey of Univariate and Learning Curve Models"; May 1993; IEEE Transactions on Engineering Management, vol. 39, No. 2, pp. 176-188.*
Clauson, Jim; "Creativity Tools from the Web", Mar. 1998, Quality Progress, Milwaukee, Mar. 1998. vol. 31, Iss. 3, p. 89, 5 pgs.*
Proctor, Tony; "Idea processing support systems", 1998, Management Decision, London, vol. 36, iss. 2 p. 111.*
Chen, Z.; "Toward a better understanding of idea processors", 1998, Information and Software Technology 40, pp. 541-553.*
Bostrom, Robert R; Nagasundaram, Murli; "Research in Creativity and GSS", 1998, IEEE, Proceedings from the 31st Annual Hawaii International Conference on System Sciences, pp. 391-405.*
Schoemaker, Paul J H; Russon, J Edward; "A Pyramid of decision approaches", Fall 1993, California Management Review, Berkley, vol. 36, Iss. 1, p. 9, 23 pgs.*
Roth, Philip L; Bobko, Philip; "A Research Agenda for Multi-attribute utility analysis in human resource management", © 1997, Human Resource Management Review, vol. 7 No. 3, pp. 341-368.*
The Wise Consortium 2002, "Review of Knowledge Management Tools", Mar. 26, 2002, Document ID 1.2 CYS / 020326.1, pp. 1-139.*

* cited by examiner

*Primary Examiner*—Jonathan G Sterrett
(74) *Attorney, Agent, or Firm*—Fish & Richardson P.C.

(57) ABSTRACT

Computer-implemented methods and computer program products implement techniques for rating ideas in an idea management system. The techniques include circulating an idea to one or more users in an organization, receiving from one or more of the users in the organization an opinion of the idea, weighting each of the grades based on a first weight, and determining a grade of the idea based on the weighted grades. The first weight represents a characteristic of the corresponding user. The opinion includes a rating of the idea and the rating of the idea comprises a grade based on a first predetermined scale.

32 Claims, 7 Drawing Sheets

SELF-BALANCING OF IDEA RATINGS

BACKGROUND

The present invention relates to data processing and more particularly to rating an idea.

An idea management system is a management tool for organizing, tracking and deploying ideas. An idea management system typically allows an organization to collect ideas from within and outside the organization and link the ideas with specific needs and/or problems that may exist within the organization.

An idea management system generally allows an organization to capture and organize ideas for the purpose of producing positive benefits for the organization. For example, with an idea management system, an organization can collect ideas from employees, customers, suppliers, industry groups, and the like, to improve business performance for rapid innovation and reduced expense, enhancing the competitive advantage of the organization. Lightweight communications model, e.g., message boards, instant messaging and group chats, are typically combined with more established communication channels, e.g., Web publishing, document management, and mailing lists, to create idea management solutions for the enterprise. With these combined technologies, a collective intelligence is developed and all users within an organization have the ability to express their innovative ideas.

SUMMARY

This specification describes methods and apparatus, including computer program products, for a self-balancing and opinion-based rating of ideas. Ideas can be rated on two scales—novelty and quality. A novelty score is intended to indicate how innovative the idea is with respect to other ideas that may exist in the system. A quality score is intended to indicate how well a given idea applies to a need. An author of a need can use the ratings, and in particular can use a determined final rating, of each proposed idea to select one of the proposed ideas.

In general, in one aspect, the specification describes computer-implemented methods, including computer program products, implementing techniques for rating ideas in an idea management system. The techniques include circulating an idea to one or more users in an organization, receiving from one or more of the users in the organization an opinion of the idea, weighting each of the grades based on a first weight, and determining a grade of the idea based on the weighted grades. The first weight represents a characteristic of the corresponding user. The opinion includes a rating of the idea and the rating of the idea comprises a grade based on a first pre-determined scale.

Particular implementations can include one or more of the following. The idea can represent a proposed solution to a need or problem of the organization. The final grade of the idea can correspond to a quality score of the idea. The quality score can represent how well the idea applies to the need or problem of the organization. The final grade of the idea can correspond to a novelty score of the idea. The novelty score can represent how innovative the idea is with respect to one or more other proposed ideas. The characteristic of the corresponding user can relate to an experience level of the user. The experience level of the user can represent a level of skill in a category. The experience level of the user can determine a level of influence of the user's opinion on the final grade of the idea. The experience level of the user can change over time according to a logarithmic scale. Users who attain a pre-determined level of experience can be rewarded. The experience level of the user can be determined based on final grades of the user's past ideas which were circulated to one or more users in the organization. The experience level of the user can be determined based on an equation substantially as follows:

$$E_{i+1} = \log_k(K^{E_i} + \frac{S}{F}),$$

where $E_i$ represents the experience level of the user after i number of actions, K represents a growth resistance index, S represents a final grade of a past idea which the user authored, and F represents a growth speed index.

The experience level of the user can be determined based on how closely the user's past opinions of past ideas match corresponding final grades of the past ideas. A second opinion of one or more of the received opinions can be received from one or more of the users in the organization. The second opinion can include a rating of a corresponding received opinion, and the rating can comprise a second grade based on a second pre-determined scale. A second weight can be determined based on the second grades. Grades can be weighted based on the first weight and the second weight. The first pre-determined scale and the second pre-determined scale can be the same. The grade of the idea can be calculated substantially as follows:

$$Grade_{idea} = \sum_{i=1}^{N} \left( Grade_{user_i} * Weight_{grade_i} * Weight_{opinion_i} \right),$$

where $Grade_{idea}$ represents the final grade, $Grade_{user_i}$ represents the opinion of a user in the organization, $Weight_{grade_i}$ represents the first weight, and $Weight_{opinion_i}$ represents the second weight.

In general, in another aspect, the specification describes computer-implemented methods, including computer program products, implementing techniques for rating ideas. The techniques include receiving from a source an opinion of an idea and weighting the opinion based on a characteristic of the source. The opinion includes a rating of the idea.

Particular implementations can include one or more of the following. The source of the opinion can be a user. The characteristic of the source can be an experience level of the user. The experience level of the user can represent a level of skill in a category. The experience level of the user can determine a level of influence on the weight of the opinion. The experience level of the user can change over time based on a logarithmic scale. A second opinion of the opinion can be received from a second source. The second opinion can include a rating of the opinion. Weighting the opinion can include weighting the opinion based on the second opinion. The second source can be a second user. The idea can be circulated to the first user and the second user.

Particular aspects of the techniques and devices described in this specification can be implemented to realize one or more of the following advantages. Use of self-balanced ratings of ideas in an idea management system allows a more accurate valuation of an organization's intangible assets. Self-balancing a rating of an idea includes re-valuating the rating based on received information, which can come from any source. The re-valuation of a rating of an idea can occur automatically. An idea management system with a self-balanced rating system can be used to assist in accurately identifying an organization's valuable human capital. Bottom line costs of intellect intensive operations and processes can be decreased while quality and focus of the operations and processes are increased. The best corporate knowledge, e.g., highly rated ideas, can be preserved in the idea management system for reuse. The details of one or more embodiments of the invention are set forth in the accompanying drawings and the description below. Other features and advantages of the invention will be apparent from the description and drawings, and from the claims.

DESCRIPTION OF DRAWINGS

Like reference numbers and designations in the various drawings indicate like elements.

DETAILED DESCRIPTION

Figure 1:
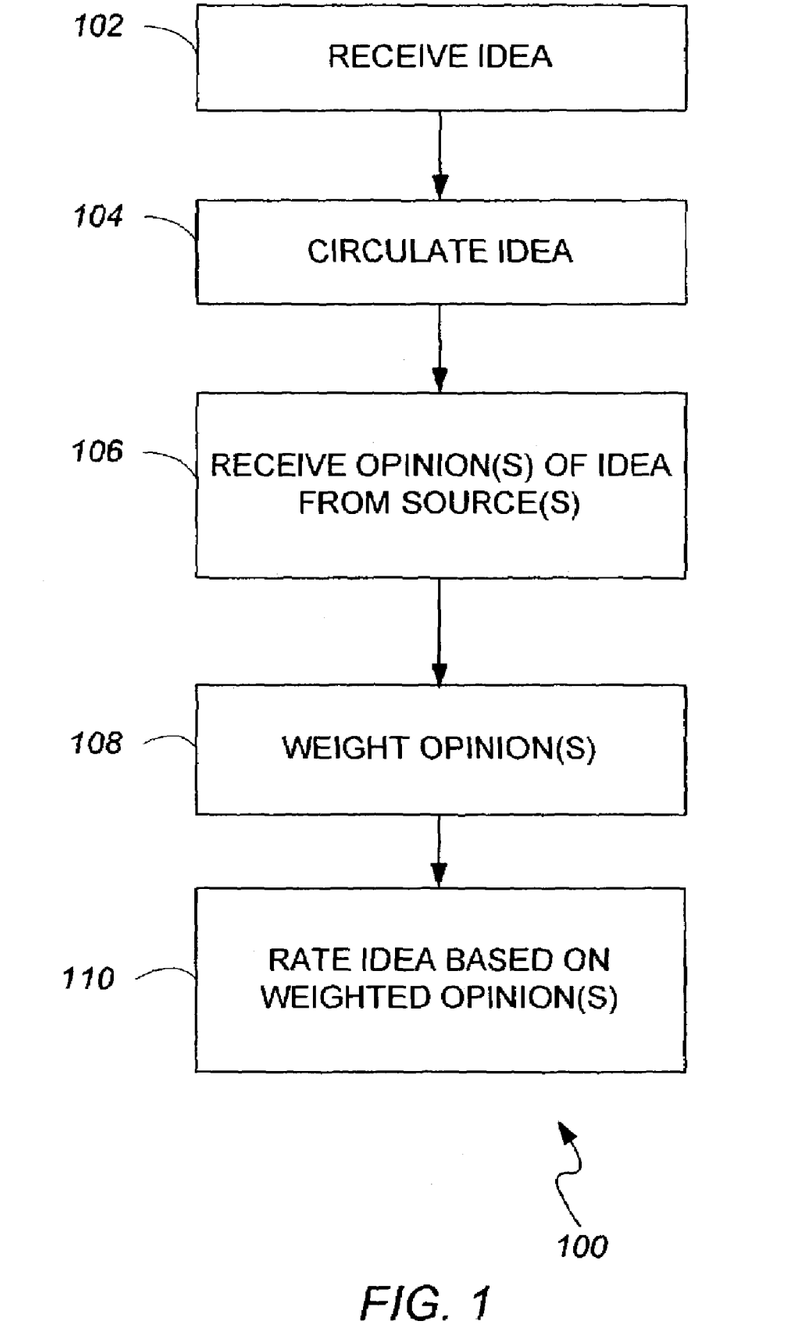
FIG. 1 is a flow chart of a method for rating an idea.

FIG. 1 illustrates a method 100 for rating an idea. A system performing method 100 receives an idea (step 102). The system circulates the idea—i.e., makes the idea available—to users of the system (step 104). The system receives opinions that each includes a rating of the idea (step 106). Each opinion originates from what will be referred to as a source, which can be a single individual or a group of individuals. Each rating includes a grade based on a pre-determined scale. The pre-determined scale can have any convenient granularity and representation.

The system weights—i.e., assigns a weight to—each opinion (step 108). In one implementation, the system weights each opinion based on one or more characteristics of its source. In the implementation being described, the system weights each grade based on one or more characteristics of the source. Characteristics of the source can include any physical or non-physical attribute of the source capable of being measured, determined, or identified. For example, characteristics can include the source's age, experience in the subject matter of the idea, size in numbers (if the source is a group). In particular, the characteristics can include measures of the quality of previously offered opinions. Optionally, the system can also use nested opinions—i.e., an opinion of an opinion—to weight opinions.

The system uses the weighted opinions to rate the idea (step 110). In one implementation, the system determines a grade for the idea from the weighted grades of the opinions submitted on the idea and the characteristics of their respective sources. As opinions are received and weighted, the system can used the weighted opinions to generate a current grade for the idea, which represents the value of the idea at a specific time. The current grade of the idea becomes a final grade once an idea is closed. Any function can be used to combine weighted opinions to generate a numerical value that represents a grade of the idea. Optionally, the system can use only selected opinions of all opinions to determine a grade for the idea.

It is advantageous to implement the method 100 in an idea rating system (which will be referred to simply as the system) in an idea management system, an example of which will now be described.

An Idea Management System

An idea management system is a data processing tool that allows an organization to expose and match ideas that exist in the organization with needs and problems, as well as to identify thought leaders and experts in various fields of knowledge so that their skills can be fully employed and rewarded.

The system—i.e., the idea rating system—can be implemented to receive, in an open, non-proprietary form, information concerning needs and problems of an organization, and ideas, opinions, and comments. The system receives information from a variety of sources, that can be either directly coupled to the system or coupled through a network such as the Internet. The system can be configured to receive information from sources through proprietary or non-open interfaces, in which case the format of the information is converted to be compatible for use in the system. The system includes data input devices, for example, keyboards and mice.

Figure 2:
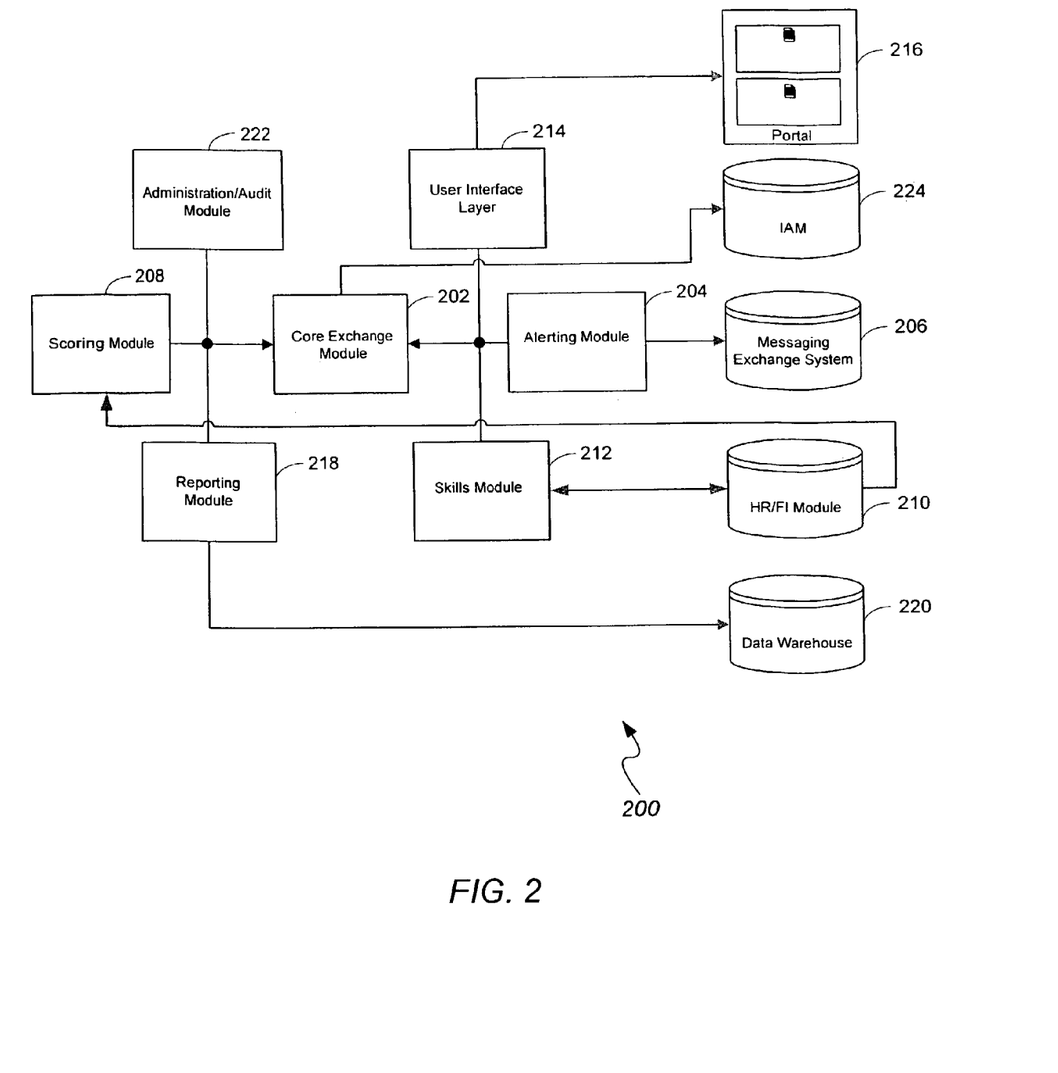
FIG. 2 shows an idea management system.

FIG. 2 shows an illustrative idea rating system 200 that includes a Core Exchange Module ("CEM") 202, an Alerting Module ("ALM") 204, a Messaging Exchange System ("MES") 206, a Scoring Module ("SCRM") 208, a Human Resources/Finance Module ("HR/FI") 210, a Skills Module ("SKM") 212, a User Interface Layer ("UIL") 214, a Portal 216, a Reporting Module ("RPTM") 218, a Data Warehouse ("DW") 220, an Administration/Audit Module ("ADM") 222, and an Intellectual Property Asset Management System ("IAM") 224. FIG. 2 also shows communication flows (represented by arrows) between and among the components of the system. The communication flows can be implemented in any convenient fashion, e.g., through the exchange of Extensible Markup Language ("XML") documents.

Each or all of the components or any combination of the system's components can be implemented on a single device or on multiple devices such as computers in a network. Each component can be distributed across multiple devices, including computers, that are communicate over a data communication network. Each component can be made up of, that is, implemented as, multiple different applications, which in the aggregate perform the functions of the component.

Core Exchange Module

Information including needs, ideas, opinions, and comments filed in the system are assigned a unique identifier. When the system receives a need, idea, opinion, or comment, or any other information, and stores the information in persistent storage, the information is deemed filed in the system. The system will generally assign one or more attributes to filed information. For example, the system can assign author, creation date, expiration date, and status (new, open, closed) to filed information.

Figure 3:
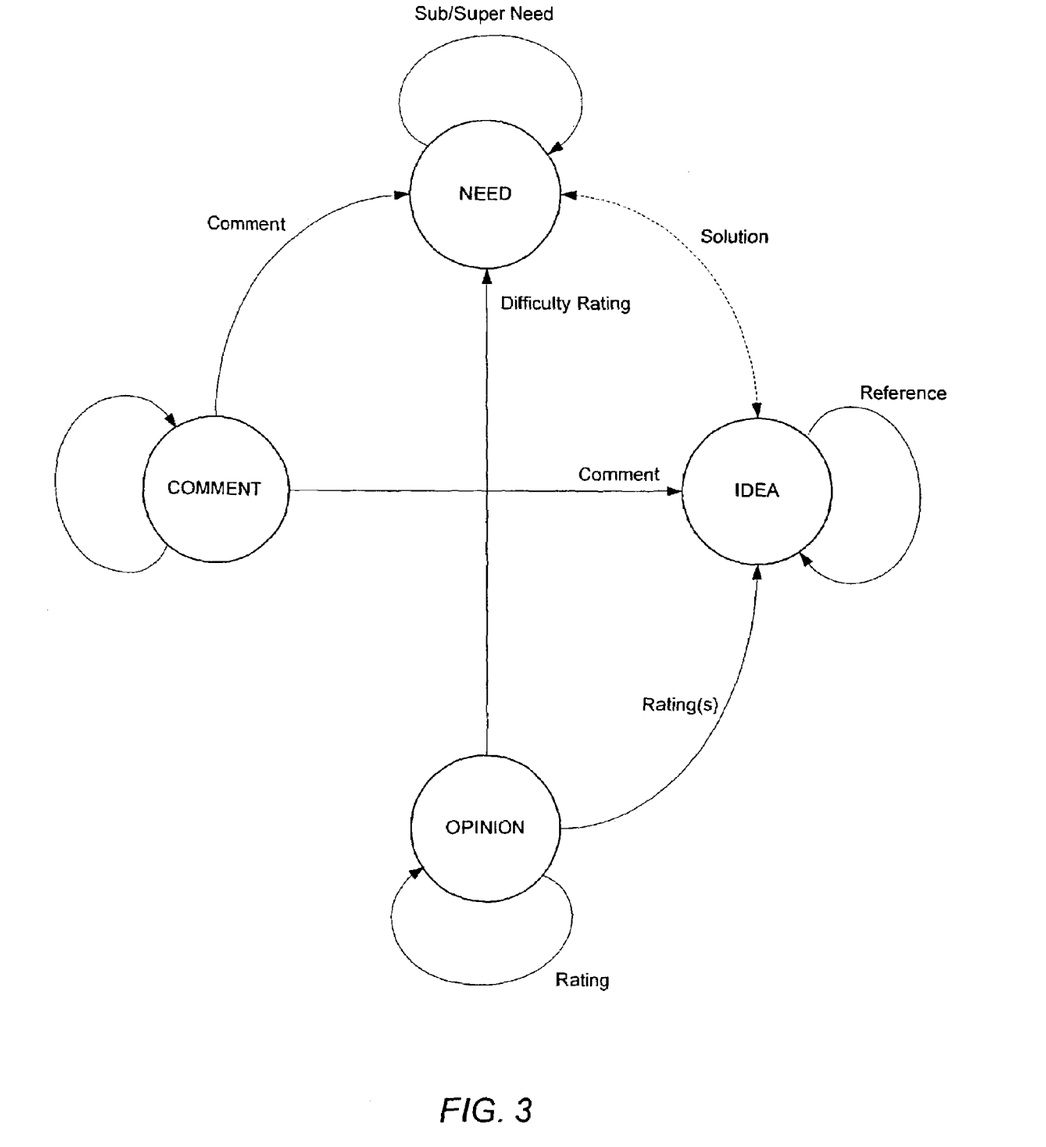
FIG. 3 shows an example relationship structure between needs and ideas in the system of FIG. 2.

The CEM 202 is a repository for storing information, including needs, ideas, opinions, and comments, filed in the system. An idea can be filed in the system in response to a previously submitted need. However, ideas can be independently filed in the system. An idea not filed in response to a need is an independent idea. FIG. 3 shows example relationships between information stored in the CEM 202. The arrows shown in FIG. 3 represent possible relationships among ideas, needs, opinions, and comments. A comment can refer to an idea, a need, or to another comment. Comments can be used to clarify ideas as well as needs and other comments. A comment is not used to rate an idea or an opinion. Comments can be implemented in the system using any of a variety of conventional techniques; e.g., comments can be implemented in the system as a discussion thread. In the example of FIG. 3, comments are not applied to opinions, i.e., opinions are not discussed through comments. Alternatively, comments can be applied to opinions as well. An opinion can refer to an idea, a need, or another opinion. A need can refer to an idea or another need. An idea can refer to a need or to another idea.

The ALM 204 can be integrated with the CEM 202 to send alerts, i.e., messages, to users that new information exists in the system. For example, whenever a new idea is filed in the system, an alert can be generated informing users of the newly submitted idea. The system can be configured to send ideas, or alerts, only to a predefined group of people. The predefined group can be, for example, a management team. The ALM 204 can send alerts to users through the MES 206. The MES 206 can be any message exchange service. For example, the MES 206 can be implemented through telephonic voicemail services, interoffice mailings, email exchanges, pager services, mobile phone message services, and the like. The MES 206 can also be used to circulate information, including needs, ideas, opinions, and comments stored in the CEM 202 to users.

Scoring Module

Rating mechanisms exist in the system to rank or assign value to information in the system. In one implementation, based on information received from the CEM 202, the SCRM 208 calculates a grade for each idea in the system. An author of a need can use the grade of each idea as a basis for selecting an idea. The grades calculated by the SCRM 208 can change until an idea is considered closed. Determination of the grades of ideas is described in greater detail below. A single SCRM 208 can be coupled to multiple CEMs 202 running on different computer systems.

The SCRM 208 can interact with the HR/FI 210. The HR/FI 210 provides human resource and finance functions including, e.g., payroll processing, personnel administration, personnel development, performance evaluation, recruitment administration, shift planning, time management functionality, budget processes, and the like.

The SCRM 208 can optionally provide incentives to motivate users to be active in the system. For example, the SCRM 208 can allot incentive points to each user based on each user's level of activity in the system. Incentive points can also be allotted to users who generate ideas that are highly rated. Users can redeem incentive points for various rewards. In one implementation, the incentive points have a monetary value. Where incentive points have monetary value, the amount of incentive points that can be allotted to users by the SCRM 208 can be determined though budgetary processes of the HR/FI 210.

The SCRM 208 can optionally use experience ratings to assign a level of expertise to each user in the system. Users of the system can be assigned experience points on a categorical basis. That is, the system can, for a user, assign varying levels of expertise for different categories of knowledge.

SKM 212 can be linked to HR/FI 210 so that users' expertise can be used for human resource-related issues. For example, a manager may desire to assemble a team of engineers who are proficient in JavaScript programming. The SKM 212 can identify users who have a pre-determined level of expertise in JavaScript programming and send names of the identified users to the HR/FI 210. In another example, a human resources-related rewards program can be established to recognize users who attain a pre-determined level of expertise in one or more fields of knowledge. These users can be rewarded and recognized as thought leaders in an organization. Experience ratings are discussed in greater detail below.

User Interface Layer

Figure 4:
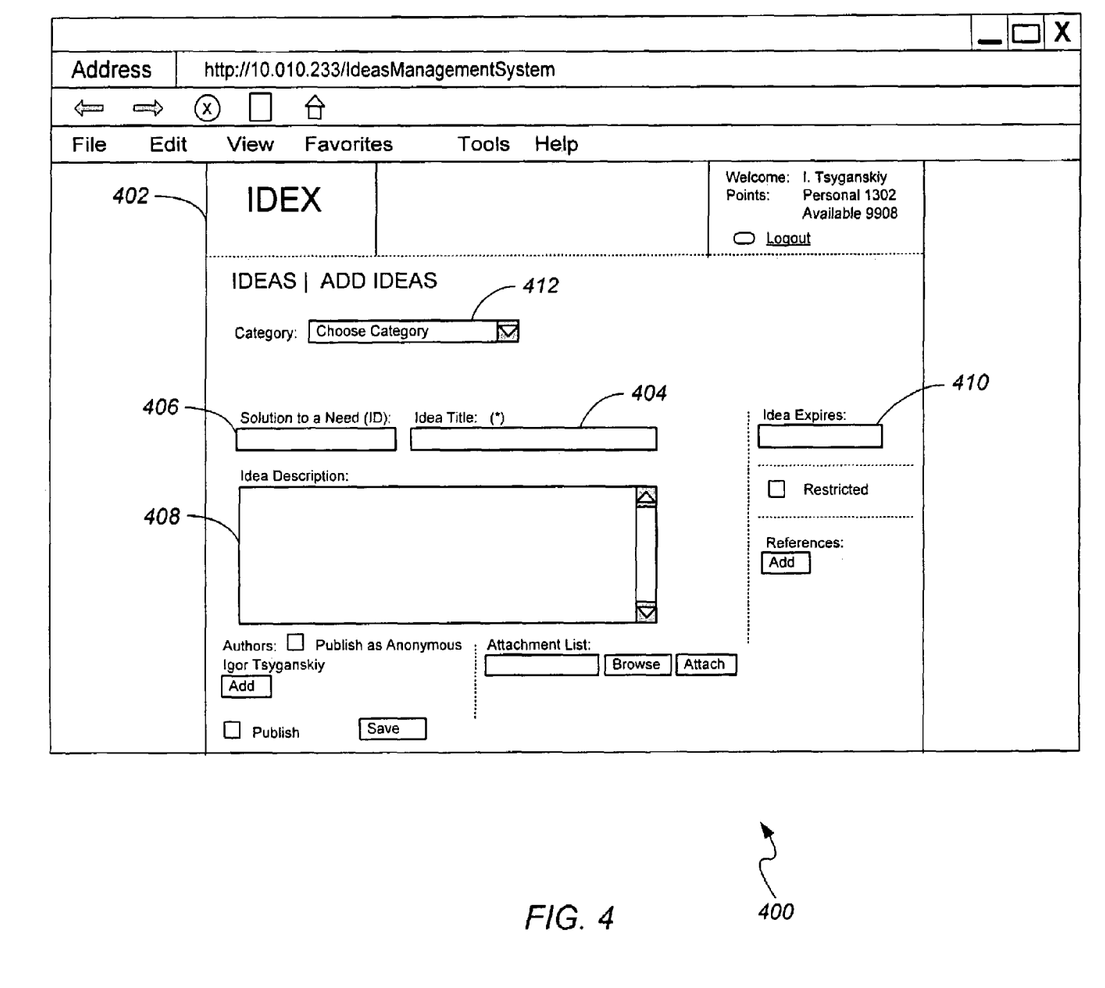
FIG. 4 shows an example graphical user interface for submitting an idea in the system of FIG. 2.

The UIL 214 can provide a graphical user interface for interaction with users. FIG. 4 shows an example graphical user interface 400 for filing an idea in the system. The graphical user interface 400 includes a dialog box 402 that has data fields for a set of parameters. In the example of FIG. 4, the dialog box 402 includes an "Idea Title" field 404 to receive a title of an idea, a "Solution to a Need" field 406 which references a need to which the idea corresponds, an "Idea Description" field 408 for a description of the idea, and an "Idea Expires" field 410 to receive a date corresponding to when the idea expires or is no longer valid, and a "Category" field 412 for a description of the category of the idea.

Ideas, opinions, and needs can be displayed to users through a graphical user interface similar to the graphical user interface 400. The information can be presented to a user in a dialog box.

The UIL 214 can be integrated within an enterprise portal 216. A portal provides information from a variety of sources including business applications, databases, email, shared documents, the Internet, and the like. Alternatively, the UIL 214 can function as a portal.

Reporting Module

The RPTM 218, in general, generates reports based on information in the CEM 202. The reports can include information relating to, for example, the number of users using the system, an average user response time in responding to a newly submitted idea, the number of ideas that are selected as solutions to needs, the number of needs that are filed versus the number of needs that are solved, the total number of experience points (of users) per category, and so forth. A category can represent an area or field of knowledge—e.g., an area of expertise.

The reports can also include useful statistics, which can be derived from information in the CEM 202. For example, in one implementation, the RPTM 218 generates a report that includes information concerning an enterprise innovation index. The innovation index provides objective criteria for determining innovation of users based on information in the CEM 202. The innovation index can be calculated substantially as follows:

$$\text{Innovation} = \frac{NeedsSolved}{TotalNeeds} + \frac{IndependentIdeasRatedHigh}{TotalIndependentIdeas},$$

where Innovation is the innovation index, NeedsSolved is the total number of needs in the system that were solved, TotalNeeds is the total number of needs filed in the system, IndependentIdeasRatedHigh is the total number of independently filed ideas that received a rating higher than a pre-determined amount, and TotalIndependentIdeas is the total number of independent ideas that were filed (i.e., the total number of ideas that were not filed in response to a need).

Reports generated by the RPTM 218 can be sent to the DW 220 for storage. Information contained on generated reports can also be exported in XML form.

Administration/Audit Module

Incentive points can be given to users of the system for any action. The ADM 222 can be used to monitor incentive point levels of users. System-wide audits can be performed periodically, e.g., quarterly, semi-annually, or annually, on the system. During an audit, incentive points can be deducted or removed from a user's profile (or account) when fraudulent activities are detected. For example, if it is found that some ideas in the system were "overrated" (i.e., elevated in value) with the intent to receive incentive points and/or to increase experience ratings, corrective measures can be taken towards the author(s) of the idea as well as the users who intentionally elevated the value of the idea.

Intellectual Property Asset Management

The IAM 224 is an interface through which ideas in the CEM 202 can be marked as patentable. Permission to mark ideas as patentable can be given to particular users or to users having particular roles, e.g., development managers, patent attorneys, or patent agents. Optionally, any user of the system can mark an idea as patentable. Information associated with each patentable idea can be sent to the IAM 224. The information collected from each patentable idea can include, e.g., author(s) of the idea, creation date, including any related ideas, comments, and needs.

Figure 5:
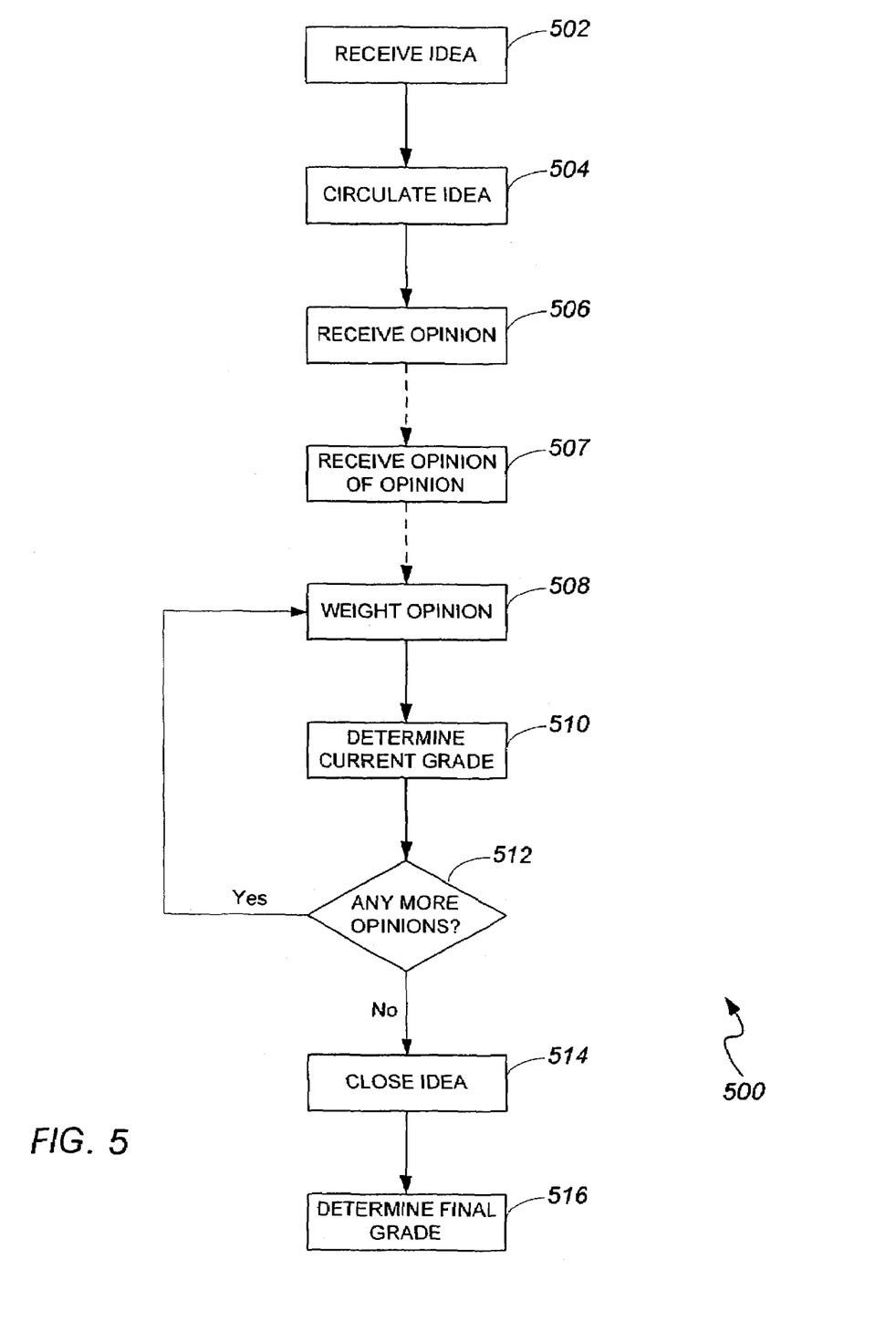
FIG. 5 illustrates an implementation of the method of FIG. 1.

FIG. 5 illustrates a method 500 that is an implementation of method 100 described above. An idea rating system performing a method 500 receives an idea (step 502). The idea can be received through graphical interface 400, as described above. The system circulates an idea to users of the system (step 504). The system receives an opinion of an idea from a user (step 506). In one implementation, a user can rate ideas (through opinions) with a grade on two different scales—"novelty" and "quality". A novelty grade is intended to indicate the opinion of the user as to how innovative the idea is with reference to one or more other proposed ideas. A quality grade is intended to indicate the opinion of the user as to how well the idea applies to an associated need or problem of the organization. The system can circulate the opinion to users of the system. Optionally, if an idea was not proposed in response to a need, then the idea does not have a quality rating. In addition to rating an idea or opinion with a grade, a user can also state reasons and justify the grade in an opinion.

The system weights the grade given in an opinion (step 508). In one implementation, the system weighs the grade based on an experience level of the user. The experience level of the user represents a level of skill in a given category of knowledge. Experience ratings can be used to determine a weight of a user in a given category. In general, experience ratings can be implemented with a grading system.

In one implementation, experience ratings can be implemented using a point-based grading system. A user can accrue experience points by filing (or submitting) ideas in the system that are rated highly. For example, a user who submits an idea that receives a good rating will receive more experience points than a user who submits an idea that receives a poor rating. A user can also accrue experience points by posting accurate opinions, i.e., opinions having grades close to the final grade given by the system.

Where ideas can be marked as patentable, having an idea marked as patentable can add experience points to a user's profile. Furthermore, if a user later receives a patent on an idea, additional experience points can be added to the user's profile.

A user's profile can be stored in the CEM 202. A user's profile can include any information concerning the user's activity in the system. For example, in addition to experience points, a user's profile can maintain an activity log of the user.

Figure 6:
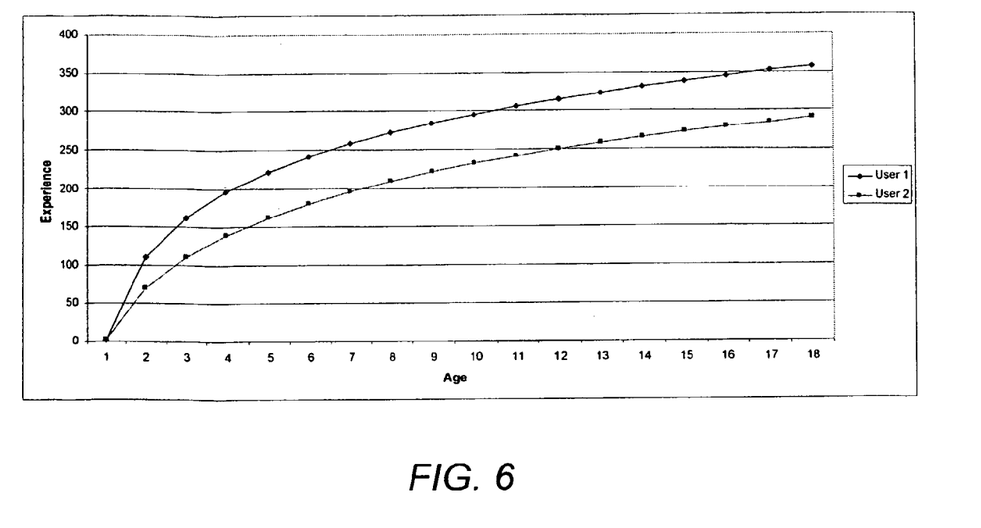
FIG. 6 shows a graph of increases in experience level over time.

A user can accrue experience points according to any predetermined function. If experience points are accrued according to a logarithmic function, the more experience points a user accrues, the more difficult it becomes for the user to gain additional experience points. FIG. 6 shows an example graph of the experience ratings of two user profiles—User 1 and User 2. User 1 consistently files ideas that are rated more highly than ideas filed by User 2. Also, User 1 files opinions that are more accurate than those of User 2. Accordingly, as shown in the graph of FIG. 6, the experience level of User 1 increases at a faster rate than the experience level of User 2. Over time, the experience level of each of User 1 and User 2 increases at a smaller rate according to a pre-selected logarithmic function.

In the following example, after a grade for an idea has been determined, the experience gained by the author of the idea is calculated substantially as follows:

$$E_{i+1} = \log_k(K^{E_i} + \frac{S}{F})$$

where $E_i$ represents the experience level of the user after i number of actions, K represents a growth resistance index, S represents a final grade of the idea which the user authored, and F represents a growth speed index. The growth factor index F controls how fast a user's experience level initially grows. The growth resistance index K controls how much a user's experience level grows once the user has accumulated experience points.

Figure 7:
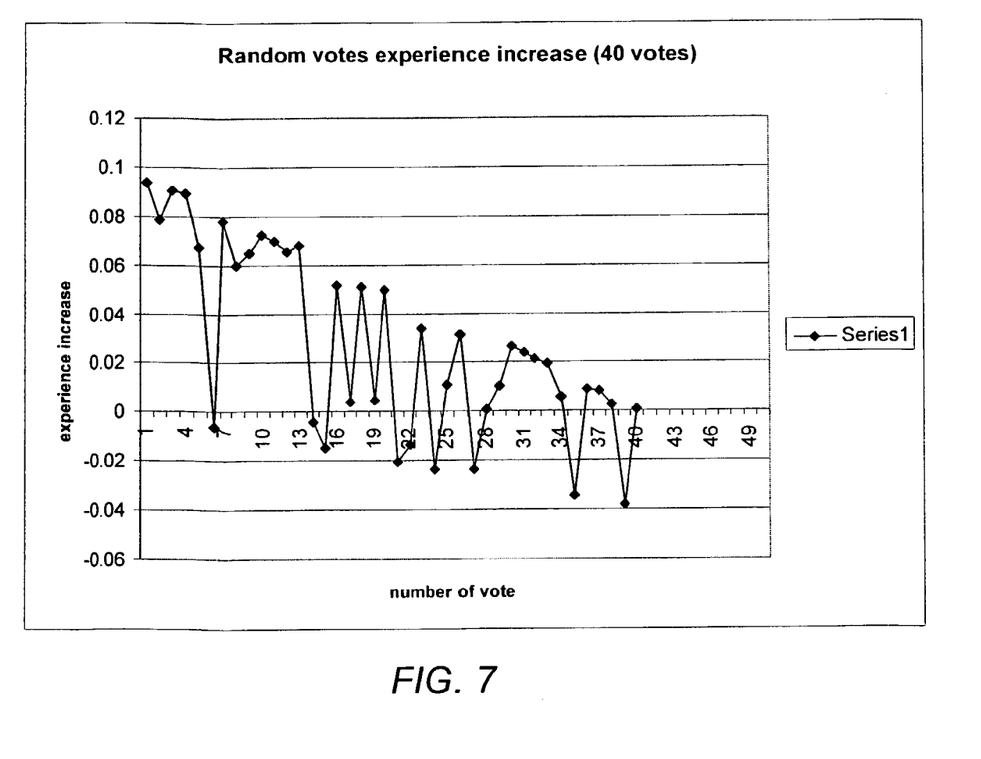
FIG. 7 shows a graph of increases in experience level based on accurate opinions.

As mentioned above, a user can also accrue experience points by posting opinions that are accurate. The system can further reward users who post accurate opinions early in the lifecycle of a need. For example, if two users rate an idea with the same score, the user who filed the earlier opinion in time will accrue more experience points than the user who posted the later opinion. In one implementation, user experience level based on user opinion is calculated substantially as follows:

$$k = \begin{cases} MAXP, \text{ if } k < MAXP \\ 1 - |R_f - R_g|^x * y \end{cases}$$

$$E_{i+1} = E_i * z * \begin{cases} k * \frac{T_R - N_R}{T_R + 1}, \text{ if } k \geq 0 \\ k * \frac{N_R + 1}{T_R + 1}, \text{ if } k < 0 \end{cases}$$

where $E_i$ represents the experience level of the user after i number of actions, $R_f$ represents the final rating of the idea, $R_g$ represents the grade given by a user (through an opinion), $T_R$ represents the total number of ratings, and $N_R$ represents number of vote of all the votes, MAXP represent a maximum penalty of experience points which can be deducted from a user's experience rating, x, y, and z represent scaling coefficients, and * represents scalar multiplication. The scaling coefficient can be used to scale the amount of opinion points a user can acquire. FIG. 7 shows a plot of the experience increases (or decreases) of 40 user profiles based on accuracy of opinion ratings. In FIG. 6, the scaling coefficients x, y, and z, have been set to 2, 5, and 0.1, respectively. MAXP has been set to −0.4. If, for example, User 1 and User 40 rated an opinion with the same score, User 1 will receive a greater amount of experience points than User 40. Thus, the system can reward users who file accurate opinions early during a lifecycle of an idea.

In one implementation of step 508, the system weights the grade given in an opinion based on an experience level of the user as follows:

$$WeightedGrade_{useri} = Grade_{useri} * Weight_{gradei}$$

$$Weight_{gradei} = Experience_{useri} \Big/ \sum_{i=1}^{N} Experience_{useri}$$

where WeightedGrade$_{user_i}$ represents the weighted opinion, Grade$_{user_i}$ represents user i's opinion, and Weight$_{grade_i}$ represents user i's weight based on the experience level of the user and the experience level of all other users.

Optionally, additional weights can be used to weight an opinion of a user. For example, in one implementation, each opinion can also have a quality rating, i.e., a user can rate an opinion's quality by filing a second opinion about the opinion (step 507). The second opinion represents a nested opinion. Opinions of opinions can be filed to form nested opinions that are multiple layers deep. The system can circulate nested opinions to users of the system. Both opinions and ideas can be rated on the same scale or on different scales. In the example above, the system can additionally weight the grade given in an opinion (in step 508) based on second opinions of the user's opinion as follows:

$$WeightedGrade_{useri} = Grade_{useri} * Weight_{gradei} * Weight_{opinioni}$$

$$Weight_{gradei} = \frac{Experience_{useri} * Weight_{opinioni}}{\sum_{i=1}^{N}(Experience_{useri} * Weight_{opinioni})}$$

$$Weight_{opinioni} = \frac{Experience_{useri} + \sum_{i=1}^{N} Grade_{useri} * Experience_{useri}}{Experience_{IdeaAuthor} + \sum_{i=1}^{N} Experience_{useri}}$$

where Weight$_{opinion_i}$ represents a determined weight based on the second opinions. For example, if a user rates an idea as 10 (good) and another user with a higher experience rating than the first user rates first user's opinion with a 1 (poor) the resulting weighted grade of the idea will move closer to 1.

The system determines a current grade based on the weighted opinions (step 510). In one implementation, the system determines a current grade of an idea substantially as follows:

$$Grade_{idea} = \sum_{i=1}^{N} WeightedGrade_{useri}$$

where Grade$_{idea}$ represents the current grade.

Opinions of users with higher experience ratings have a greater weight on the final idea or final grade for an idea.

The system determines whether the system has received any more opinions (step 512). If the system receives another opinion or a nested opinion ("yes" branch of decision step 512), the system returns to step 508 and weights the appropriate opinion. The system closes the idea (step 514). A closed idea is described in greater detail below. The system determines a final grade of the idea (step 516). The final grade of the idea can be the current grade of the idea at the time the idea is closed.

Operation

The following generally describes how the system matches and aligns organizational needs and problems with ideas. In one implementation, an idea in the system has the following representation in CEM 202 as seen in table 1 below.

TABLE 1

| Parameter | Definition |
|---|---|
| ID | Idea's unique ID in the system |
| Dates | Idea's creation, modification, last access and expiration dates |
| Status | New, open, closed (completed, expired, revised) |
| Author(s) | Creator(s) of the idea |
| Owner(s) | Relationship to the appropriate needs if any |
| Rating | Novelty, quality |
| Reference(s) | References to other ideas, opinions, and comments |
| Classification | Category/categories to which idea belongs |
| Type | Patentable, duplicate (cumulative) |
| Body | Documents associated with an idea |

As shown in table 1, each idea in the system is identified with a unique identifier (ID). Each idea can also have associated time stamps, such as a creation date, modification date(s), last access date and an expiration date.

In one implementation of the system, when an idea's status is "new", the idea is only visible to the authors of the idea. Once an idea's status is marked as "open", the idea becomes visible to other users of the system. Ideas can be withdrawn, even when the status of the idea is set to open. An idea can be revised. Revision of ideas can be implemented by generating a new idea and referencing the new idea to the original idea (or parent idea). Revised ideas are also referenced to any comments and opinions used during the revision process. A revised idea does not inherit any of the ratings or grades from the parent idea. In one implementation, an original idea is closed when the original idea has been revised, and users cannot gain experience points based on the original idea (i.e., the parent idea is set to "closed-revised" when the revised idea is set to "open".) In another implementation, an original idea is not closed when the original idea is revised. Instead, the original idea and the new revised idea co-exist in the system and users can gain experience points from solving the original idea as well as the revised idea.

An idea can be linked to one or more needs. In one implementation, when an idea is linked to more than one need, multiple instances (children) of the idea exist in the system, corresponding to each need. A child instance of an idea contains the same attributes as the parent idea.

Ideas can have a novelty rating and a quality rating as shown in table 2 above, and as discussed above. When a single opinion is used to rate both quality and novelty of an idea, nested opinions of the single opinion will also weight both on the quality and novelty of the idea. In one implementation, when an idea is filed independent of any needs, the idea's quality rating is disabled. An idea can have a separate quality rating for every need to which the idea is linked.

An author of an idea can be anonymous in the system. There need be no consequences for being an anonymous author of an idea. If an idea was created in response to a specific need, the author of the idea can decide to make the idea visible only to the need's author(s)—i.e., the idea is non-public. In this implementation, only the need's author(s) can review and rate the idea; however, an author of the need can make the non-public idea visible (or public) to all users in the system. The ratings (or score) and titles of all ideas are public.

A need can have the following parameters associated with it in CEM 202 as seen in table 2 below.

TABLE 2

| Parameter | Definition |
| --- | --- |
| ID | Need's unique ID in the system |
| Dates | Need's creation, modification, last accessed and various expiration dates |
| Status | New, open, closed (completed, expired, revised) |
| Author(s) | Author(s) of a need |
| Reference(s) | Reference(s) to other needs, ideas, opinions, comments |
| Stages | Need's stages |
| Classification | Category/categories to which idea belongs |
| Points | Incentive point plan associated with an idea |
| Type | Duplicate (cumulative) |
| Body | Documents associated with an idea |

Any person in an organization can file a need in the system. Needs can be filed anonymously. As shown in table 2 above, a need can have an expiration date as well as a "solution value". The solution value of a need equal to the amount of incentive points associated with the need. The solution value of a need can be determined by the author of the need. An organization can distribute budgets of incentive points in a similar fashion as monetary budgets are distributed.

When a status of a need is "new", the need can be revised. When the status of a need is set to "open" (i.e., the need is made visible to users of the system), in one implementation, the need can no longer be revised. Instead, users can revise the need by creating a new need that references original need (or parent need), including any comments used in the creation of the parent need. A need cannot be withdrawn once the need's status is set to "open".

A need can have associated stages. An author of a need can create a set of standard stages during a lifetime of the need. Stages allows needs to have additional "compensation plans". For example, in one implementation, if a need is not solved by a pre-determined date (e.g., during a first stage) the need's compensation value goes down, or up, as determined by the author of the need.

Figure 8:
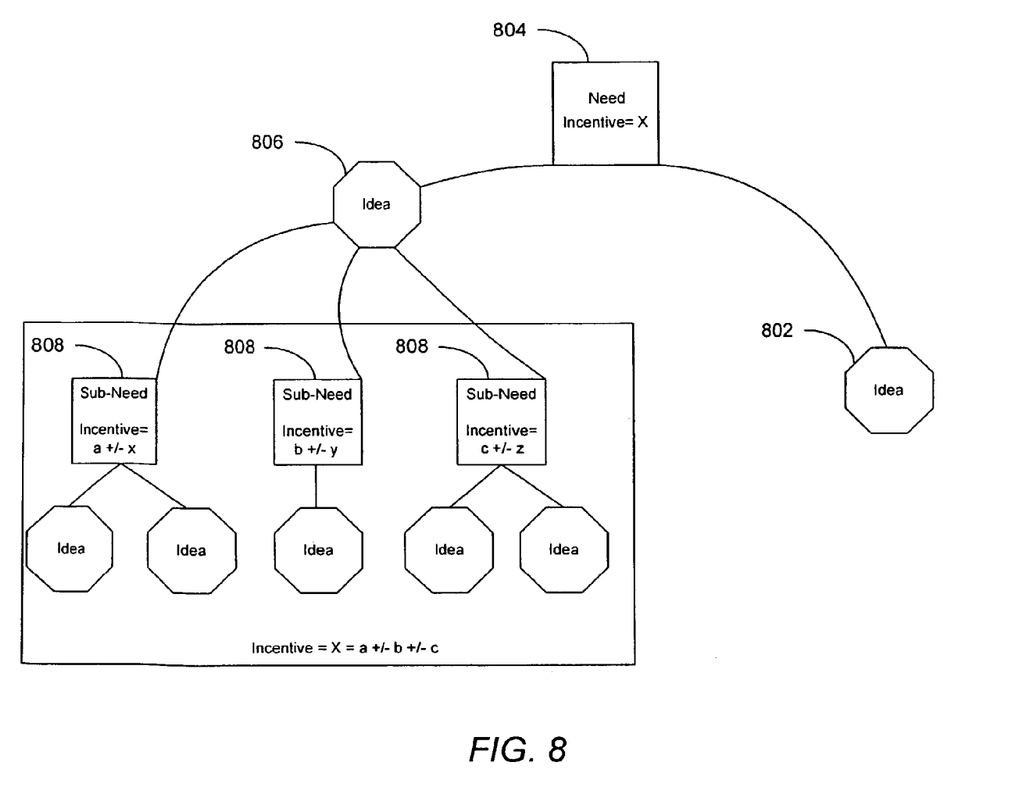
FIG. 8 shows an example of multiple ideas used to solve multiple needs.

As shown in FIG. 8, multiple ideas can be filed in response to a single need. Idea 802 was filed in response to the need 804. If idea 802 is selected as a solution to need 804, then the author(s) of idea 802 will receive all of the incentive points associated with need 804.

Needs can be subdivided into sub-needs. Idea 806 was also filed in response to need 804. However, the author of idea 806 may know the solution to need 804 only if some sub-needs 808 are first solved. Thus, the author of idea 806 can author sub-needs 808. In one implementation, initial incentive points for the sub-needs 808 are the same as the incentive points for need 804 plus additional incentive points from the budget of the author of the sub-need. Alternatively, the incentive points for the sub-needs 808 can less than the total incentive points for need 804. In one implementation, the distribution of incentive points for solving a sub-need (e.g., sub-needs 808) is contingent upon acceptance of the parent idea (e.g., idea 806) as a solution to the parent need (e.g., need 804). Alternatively, the distribution of incentive points for solving a sub-need occurs when the author of the sub-need accepts a sub-idea. If the author's parent idea is not accepted as a solution to the parent need, then the author of the sub-idea receives incentive points for solving the sub-need from the account of the author of the sub-need.

Idea Selection

Generally, an author of a need will select an idea that has the highest final value or rating as determined by the SCRM 204. However, an author of a need is free to select any idea from the group of ideas. In one implementation, rules are implemented in the system such that an author of a need must explain why a certain idea was selected if the selected idea does not have the highest final rating among the group of ideas, or if the selected idea's final rating is below a predetermined level. When an author of a need selects a non-public idea, the author of the need must submit a comment explaining why the non-public idea was selected over all of the public ideas that may exist. Such rules exist in the system to aid users in understanding why a particular idea (or combination of ideas) was selected to fulfill a need.

An author of a need can assign another user or person to select an idea from the group of ideas in the system on the author's behalf—e.g., an expert in the field. An author of a need can also assign a group of two or more users to select an idea on behalf of the author. In such a circumstance, a percentage of users in the group must agree in the selection of an idea. The percentage of users that must agree on an idea selection can be determined by the author.

An idea's final novelty and quality ratings directly correlate to experience ratings and incentive points users acquire. When an idea is selected as a solution to a given need, the author of the selected idea acquires incentive points associated with the need. In one implementation, a user's current experience level at the time the idea is selected is used for calculating the incentive points. Alternatively, the experience level at the time the user submitted an opinion or idea is used for calculating the incentive points. Any number of other conventions can be used as well.

The invention can be implemented in digital electronic circuitry, or in computer hardware, firmware, software, or in combinations of them. The invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks. The processor and the memory can be supplemented by, or incorporated in special purpose logic circuitry.

To provide for interaction with a user, the invention can be implemented on a computer having a display device such as a CRT (cathode ray tube) or LCD (liquid crystal display) monitor for displaying information to the user and a keyboard and a pointing device such as a mouse or a trackball by which the user can provide input to the computer. Other kinds of devices can be used to provide for interaction with a user as well; for example, feedback provided to the user can be any form of sensory feedback, such as visual feedback, auditory feedback, or tactile feedback; and input from the user can be received in any form, including acoustic, speech, or tactile input.

The invention can be implemented in a computing system that includes a back-end component, e.g., as a data server, or that includes a middleware component, e.g., an application server, or that includes a front-end component, e.g., a client computer having a graphical user interface or an Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN"), a wide area network ("WAN"), and the Internet.

A number of embodiments of the invention have been described. Nevertheless, it will be understood that various modifications may be made without departing from the spirit and scope of the invention. For example, the order of performing steps of the invention may be changed and still achieve desirable results. Accordingly, other embodiments are within the scope of the following claims.

What is claimed is:

1. A computer-implemented method for rating ideas in an idea management system, the method being performed by execution of computer readable program code by at least one processor of at least one computer system, the method comprising:

circulating, using the processor, an idea to one or more users in an organization;

receiving, using the processor, from one or more of the users in the organization an opinion of the idea, the opinion including a rating of the idea, the rating of the idea comprising a grade based on a first pre-determined scale;

weighting, using the processor, each of the grades based on a first weight, the weight representing a characteristic of the corresponding user, wherein the characteristic of the corresponding user relates to an experience level of the user determined based on an equation substantially as follows:

$$E_{i+1} = \log_k(K^{E_i} + \frac{S}{F}),$$

where $E_i$ represents an experience level of the user after i number of actions, K represents a growth resistance index, S represents a final grade of a past idea which the user authored, and F represents a growth speed index;

determining and recording, using the processor, a grade of the idea based on of the weighted grades;

receiving, using the processor, from one or more of the users in the organization a second opinion of one or more of the received opinions, the second opinion including a rating of a corresponding received opinion, the rating of the corresponding received opinion comprising a second grade based on a second pre-determined scale;

determining, using the processor, a second weight based on the second grades; and wherein weighting each of the grades based on the first weight includes weighting each of the grades based on the second weight.

2. The method of claim 1, wherein the idea represents a proposed solution to a need or problem of the organization.

3. The method of claim 2, wherein the final grade of the idea corresponds to a quality score of the idea, the quality score representing how well the idea applies to the need or problem of the organization.

4. The method of claim 1, wherein the final grade of the idea corresponds to a novelty score of the idea, the novelty score representing how innovative the idea is with respect to one or more other proposed ideas.

5. The method of claim 1, wherein the experience level of the user represents a level of skill in a category, the experience level of the user determining a level of influence of the user's opinion on the final grade of the idea.

6. The method of claim 5, wherein the experience level of the user changes over time according to a logarithmic scale.

7. The method of claim 6, further comprising: rewarding users who attain a pre-determined level of experience.

8. The method of claim 5, wherein the experience level of the user is determined based on final grades of the user's past ideas which were circulated to one or more users in the organization.

9. The method of claim 5, wherein the experience level of the user is determined based on how closely the user's past opinions of past ideas match corresponding final grades of the past ideas.

10. The method of claim 1, wherein the first pre-determined scale and the second pre-determined scale are the same.

11. The method of claim 1, wherein the grade of the idea is calculated substantially as follows:

$$Grade_{idea} = \sum_{i=1}^{N} \left(Grade_{user_i} * Weight_{grade_i} * Weight_{opinion_i}\right),$$

where $Grade_{idea}$ represents the final grade, $Grade_{user_i}$ represents the opinion of a user in the organization, $Weight_{grade_i}$ represents the first weight, and $Weight_{opinion_i}$ represents the second weight.

12. A computer-implemented method for rating ideas, the method being performed by execution of computer readable program code by at least one processor of at least one computer system, the method comprising:

receiving, using the processor, from a source an opinion of an idea, the opinion including a rating of the idea;

weighting, using the processor, the opinion based on a characteristic of the source and recording the weighted opinion, wherein the characteristic of the corresponding source relates to an experience level of a user determined based on an equation substantially as follows:

$$E_{i+1} = \log_k(K^{E_i} + \frac{S}{F}),$$

where $E_i$, represents an experience level of the user after i number of actions, K represents a growth resistance index, S represents a final grade of a past idea which the user authored, and F represents a growth speed index;

receiving, using the processor, from one or more users in an organization a second opinion of the received opinion, the second opinion including a rating of the received opinion, the rating of the corresponding received opinion comprising a grade based on a pre-determined scale;

determining, using the processor, a weight based on the second grades; and wherein weighting the opinion based on the characteristic of the source includes weighting the opinion based on the second weight.

13. The method of claim 12, wherein the experience level of the user represents a level of skill in a category, the experience level of the user determining a level of influence on the weight of the opinion.

14. The method of claim 13, wherein the experience level of the user changes over time based on a logarithmic scale.

15. The method of claim 12, wherein the second source is a second user.

16. The method of claim 15, wherein the idea is circulated to the first user and the second user.

17. A computer program product, tangibly stored on a computer readable medium, for rating ideas in an idea management system, the product comprising instructions to cause a processor to:

circulate an idea to one or more users in an organization;

receive from one or more of the users in the organization an opinion of the idea, the opinion including a rating of the idea, the rating of the idea comprising a grade based on a first pre-determined scale;

weight each of the grades based on a first weight, the weight representing a characteristic of the corresponding user, wherein the characteristic of the corresponding user relates to an experience level of the user determined based on an equation substantially as follows:

$$E_{i+1} = \log_k\left(K^{E_i} + \frac{S}{F}\right),$$

where $E_i$ represents an experience level of the user after i number of actions, K represents a growth resistance index, S represents a final grade of a past idea which the user authored, and F represents a growth speed index;

determine and record a grade of the idea based on of the weighted grades;

receive from one or more of the users in the organization a second opinion of one or more of the received opinions, the second opinion including a rating of a corresponding received opinion, the rating of the corresponding received opinion comprising a second grade based on a second pre-determined scale;

determine a second weight based on the second grades; and wherein weighting each of the grades based on the first weight includes weighting each of the grades based on the second weight.

18. The product of claim 17, wherein the idea represents a proposed solution to a need or problem of the organization.

19. The product of claim 18, wherein the final grade of the idea corresponds to a quality score of the idea, the quality score representing how well the idea applies to the need or problem of the organization.

20. The product of claim 17, wherein the final grade of the idea corresponds to a novelty score of the idea, the novelty score representing how innovative the idea is with respect to one or more other proposed ideas.

21. The product of claim 17, wherein the experience level of the user represents a level of skill in a category, the experience level of the user determining a level of influence of the user's opinion on the final grade of the idea.

22. The product of claim 21, wherein the experience level of the user changes over time according to a logarithmic scale.

23. The product of claim 22, further comprising instructions to cause a processor to:

rewarding users who attain a pre-determined level of experience.

24. The product of claim 21, wherein the experience level of the user is determined based on final grades of the user's past ideas which were circulated to one or more users in the organization.

25. The product of claim 21, wherein the experience level of the user is determined based on how closely the user's past opinions of past ideas match corresponding final grades of the past ideas.

26. The product of claim 17, wherein the first pre-determined scale and the second pre-determined scale are the same.

27. The product of claim 17, wherein the grade of the idea is calculated substantially as follows:

$$Grade_{idea} = \sum_{i=1}^{N} \left(Grade_{user_i} * Weight_{grade_i} * Weight_{opinion_i}\right),$$

where $Grade_{idea}$ represents the final grade, $Grade_{user_i}$ represents the opinion of a user in the organization, $Weight_{grade_i}$ represents the first weight, and $Weight_{opinion_i}$ represents the second weight.

28. A computer program product, tangibly stored on a computer readable medium, for rating ideas, the product comprising instructions to cause a processor to:

circulate an idea to one or more users in an organization;

receive from a source an opinion of an idea, the opinion including a rating of the idea;

weight the opinion based on a characteristic of the source and record the weighted opinion, wherein the characteristic of the corresponding source relates to an experience level of a user determined based on an equation substantially as follows:

$$E_{i+1} = \log_k\left(K^{E_i} + \frac{S}{F}\right),$$

where $E_i$ represents an experience level of the user after i number of actions, K represents a growth resistance index, S represents a final grade of a past idea which the user authored, and F represents a growth speed index;

receive from one or more users in an organization a second opinion of the received opinion, the second opinion including a rating of the received opinion, the rating of the corresponding received opinion comprising a grade based on a pre-determined scale;

determine a weight based on the second grades; and wherein weighting the opinion based on the characteristic of the source includes weighting the opinion based on the second weight.

29. The product of claim 28, wherein the experience level of the user represents a level of skill in a category, the experience level of the user determining a level of influence on the weight of the opinion.

30. The product of claim 29, wherein the experience level of the user changes over time based on a logarithmic scale.

31. The product of claim 28, wherein the second source is a second user.

32. The product of claim 31, wherein the idea is circulated to the first user and the second user.

* * * * *